(12) United States Patent
Lehuede

(10) Patent No.: US 7,283,341 B2
(45) Date of Patent: Oct. 16, 2007

(54) PROTECTOR FOR OVER TENSIONS OF INDUSTRIAL AND HOME NETWORKS

(76) Inventor: Patricio Lagos Lehuede, Av. Los Pajaritos 6030, Estacion Central, Santiago (CL)

( * ) Notice: Subject to any disclaimer, the term of this patent is extended or adjusted under 35 U.S.C. 154(b) by 69 days.

(21) Appl. No.: 10/973,645

(22) Filed: Oct. 27, 2004

(65) Prior Publication Data
US 2006/0034031 A1  Feb. 16, 2006

(30) Foreign Application Priority Data
Oct. 27, 2003  (CL) .................................. 2184-2003

(51) Int. Cl.
*H02H 9/00* (2006.01)
(52) U.S. Cl. .................................................. 361/56
(58) Field of Classification Search ................ 361/56, 361/118
See application file for complete search history.

(56) References Cited

U.S. PATENT DOCUMENTS 4,586,104 A * 4/1986 Standler ..................... 361/119
4,644,437 A * 2/1987 Robe ............................. 361/56
5,570,260 A * 10/1996 Kanai et al. ................. 361/91.8

* cited by examiner

*Primary Examiner*—Michael Sherry
*Assistant Examiner*—Boris Benenson
(74) *Attorney, Agent, or Firm*—Manelli Denison & Selter PLLC

(57) ABSTRACT

There are multiple distortions and anomalies during the operation of the electric energy sources. The anomaly that with more incidence produces destruction is the over voltage, when the voltage of the feeder source goes over the maximum level supported by the isolation system of one equipment or device. A device is provided to protect industrial and domiciliary installations against over voltages. This device is built with passive elements, i.e., resistors, diodes, Zener Diodes and by controllable interrupters by the use of gate currents. This device is connected to the network as protection. When a voltage level higher than the pre-selected and adjusted level appears in the network, the protection produce a controlled short-circuit in the network that is cleared by a thermo magnetic interrupter that is part of the circuit to be protected, achieving in this way the over voltage clearing. The protection result is very effective, i.e. protects against over voltage to adjusted levels to a level closer to the maximum operation level of the devices that are connected to the network.

23 Claims, 3 Drawing Sheets

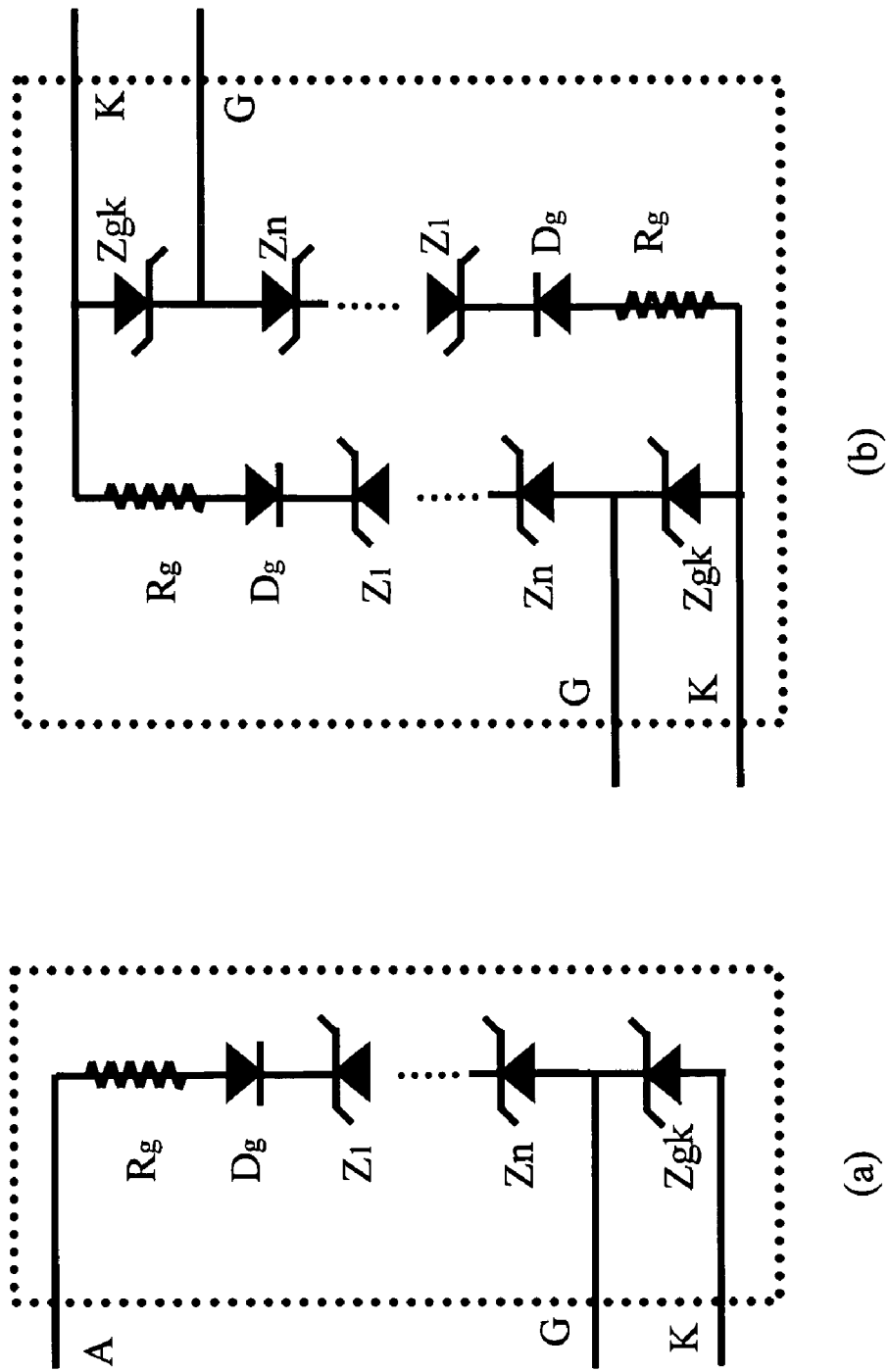
Figure Nº1: Detection and Firing Elements (a) Unidirectional y (b) Bidirectional.

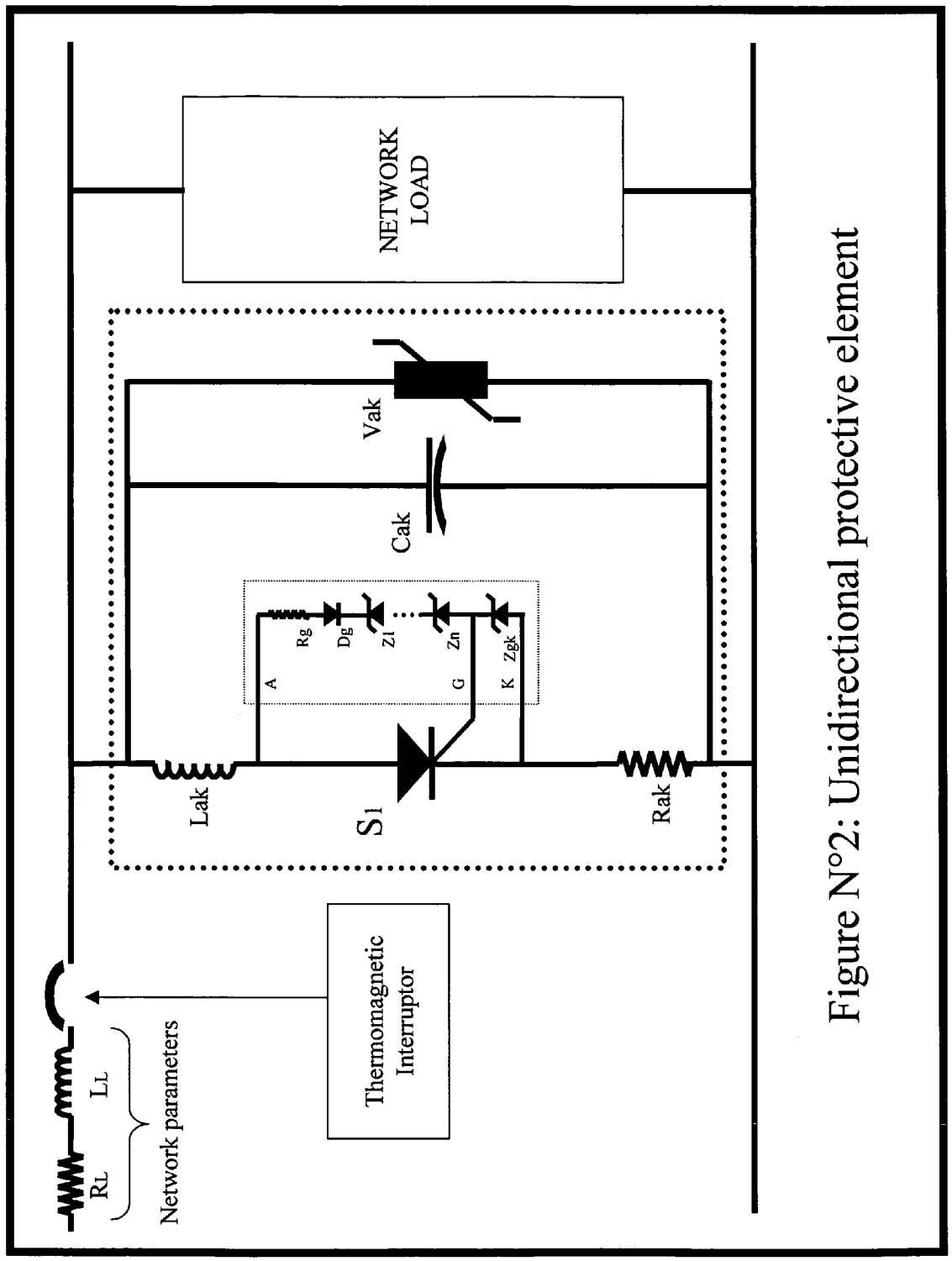
Figure N°2: Unidirectional protective element

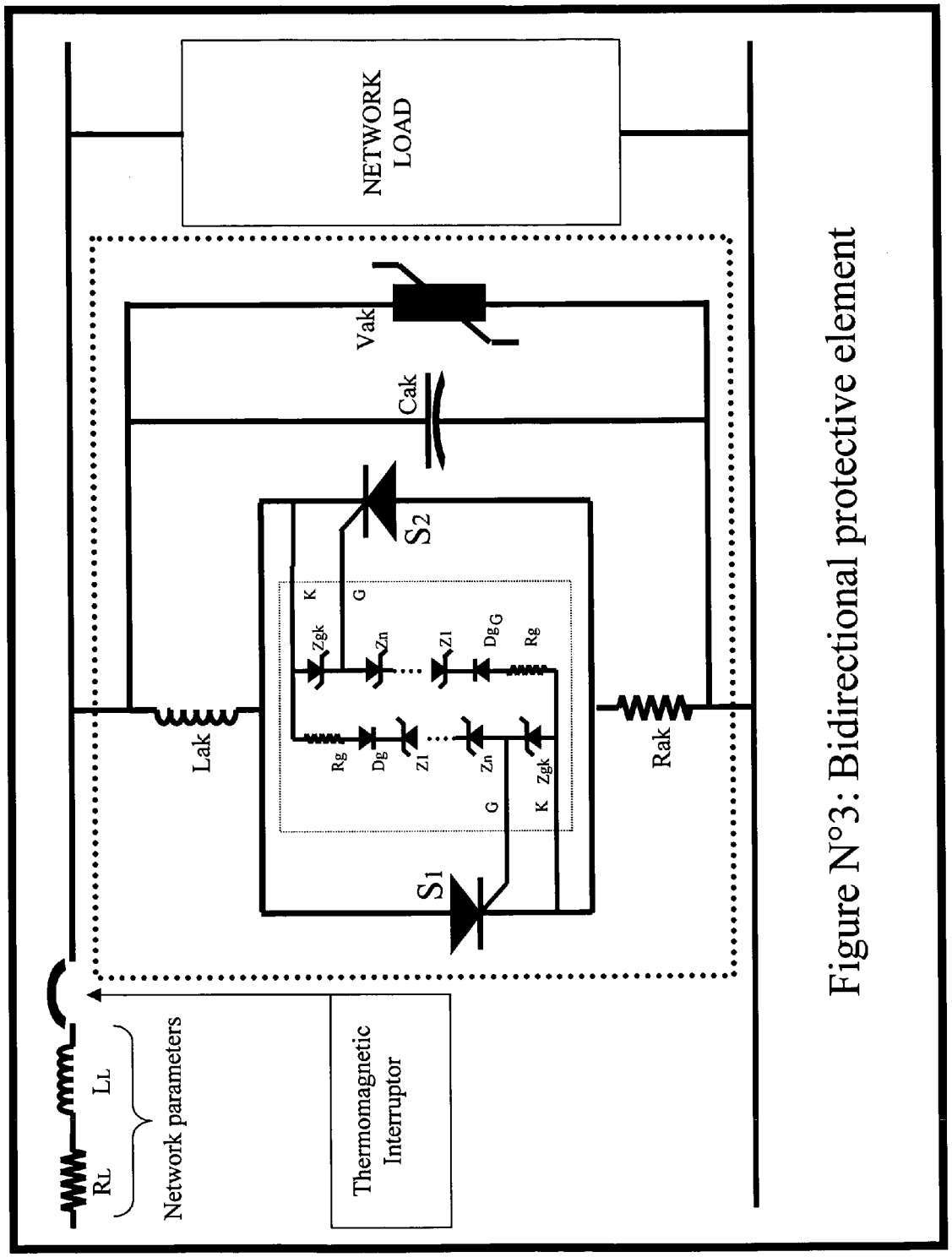
Figure N°3: Bidirectional protective element

PROTECTOR FOR OVER TENSIONS OF INDUSTRIAL AND HOME NETWORKS

DESCRIPTION OF THE INVENTION

Overvoltages in the Feeder Networks for Medium and Low Voltage

There are multiple distortions and anomalies in the operation of the electric energy sources. The anomaly that with more incidence produce destruction is the over voltage, when the voltage of the feeder source goes over the maximum isolation level of one equipment or device.

Depending on the system or component of the isolation system, a failure could be produced as a consequence of a disruptive voltage (Very fast) of high energy, however the equipment will overcome in a better way a moderate voltage for a longer time an vice versa.

The disruptive over voltage normally will produce the damage and perforation of some component of the isolation system.

The moderate over voltage of long duration will normally produce the destruction of some component of the isolation systems because of the progressive overheating.

As follows could be found some phenomena's between others that could cause over voltage:

Atmospheric discharges: Are consequence of the accumulated static electric energy in the air and discharged in the vicinity of the transmission lines, substations or electric loads. Normally produces over voltages of high energy and short duration.

Transients because of load connection and disconnection: Every time that happen to be changes in the load, some events are produced that could be described as an oscillation in the voltage feeder that are mitigated during the time. Normally these phenomena's produces moderate over voltages of short duration depending on the network seize in relation to the variation of the load Failures in the topology of the distribution networks of medium and low voltage: Due to inadequate connections, line cuts, etc a change could be produced in the topology of the network that could end in an over voltage in one of the feeder lines.

Methods from the Prior Art used to Mitigate Overvoltages

Nowadays, several protections against over voltages are utilized, like surge arresters, over voltage relays, varistors, filters and snubbers networks for over voltage. The surge arresters are devices that produces an over voltage discharge. The varistors are resistive elements with one special characteristic, presenting a high impedance when the element is operated at low voltages and a low impedance when this element is operated at higher voltages. Over Voltage Snubber networks are circuits to be installed in different locations in the circuits for protecting the circuit against of over voltages of short duration.

Eficacy of the Protection Methods

The protection must be designed considering the following basic elements:

The maximum admissible voltage of the elements of the circuit to be protected.

The operation voltage of the circuit.

The efficacy of the mentioned protection methods are adequate against over voltages of very high magnitude. i.e the protection operates at any voltage level higher than the nominal voltage of the loads and for this reason are insufficient (surge arresters, varistors and snubber networks). The equipments, electric components involved in the network operation should be designed to resist very high over voltages (several times the normal operation voltage) and as consequence a very high value of the equipments due to the following reasons:

Equipment for very specific use and high resistance.

The Design of the circuits with components that must resist several times de maximum nominal voltage of the circuit or complex circuit designed with the use of semiconductor elements, each one with it their own protection The protection using conventional techniques is expensive or not possible sometimes due to technical restrictions due to the fact they need a high accumulation of energy and also very high energy dissipation.

The protection using Varistors in not efficient, a Varistor of 700V is typically fired starting at 1100V

BRIEF DESCRIPTION OF THE DRAWINGS

FIG. 1a is a sketch of unidirectional detection and firing elements of an embodiment of the invention.

FIG. 1b is a sketch of bidirectional detection and firing elements of an embodiment of the invention.

FIG. 2 is a sketch of unidirectional protective element in accordance with an embodiment of the invention.

FIG. 3 is a sketch of bidirectional protective element in accordance with an embodiment of the invention.

THE INVENTION

The subject matter of the present invention is a device designed to protect industrial and domiciliary installations against over voltages and also capable to be coordinated with the other protections of the system. The device is designed with the following elements:

Snubber Elements: Like the Lak reactor, Rak resistor, Cak capacitor and Vak Varistor.

Semiconductor principal elements Sx: Is the element in which the current flows when the protection is operated.

Element of detection and turn on: It is composed by resistors, diodes and Zener Diodes. The protection operation level is determinate by the voltage level of the Zener diode.

The device of the present invention is capable of clearing over voltages by means of the following procedure.

Initially and when the operation voltage is lower than the maximum operation voltage, the main principal semiconductors Sx are turned off, i.e., the current in all the elements of the protection device is zero with exception in the Cak Capacitor.

In the moment that the over voltage appears, i.e when the current goes over a pre-determinate and adjusted limit by the incorporation of Zener Diodes, a current begins to flow (Ig) by the detection and turn-on element (Rg, Dg, Z1, ..., Zn) and by the turning on the terminal of the semiconductor Sx.

In the moment that the current reaches the turn-on limit of the semiconductor, this component is turn-on and the current is cut off Ig.

The current that flows by Lak and by Rak, starts to flow from the main junction of the main semiconductor Sx. The current is controlled by Lak and Rak. Lak is used to avoid the destruction of the main semiconductor Sx because of the increasing amount of the current (Semiconductor protection Di/dt)

The over voltage is cleared

To control the over current produced by the operation of the protection, there is two possibilities:

If the source is an alternated voltage source, once the over voltage disappear, the failure will be cleared in the instant that the current reaches the 0 level. However, if the thermo magnetic protection of the voltage circuit operates, the circuit will be disconnected. In general, this protection should be associated and coordinated to a thermo magnetic interrupter.

If the source corresponds to a DC voltage source, the current will not reach the zero value. It then requires an over current protection that could be a thermo magnetic interrupter or and interruption of the source.

The advantages presented by the invention has the following characteristics:

Robust protection, due to the fact that operates under all critic conditions to protect the circuit. The circuit is designed with power electronic components not requiring integrated circuits and no power sources that could be interrupted.

Invisible protection due to the Fact that under normal operation it does not produce circuit alteration Very Efficacy protection due to the Fact that operates at levels slightly higher than the maximum nominal voltage of the circuit and for this reason components could be specified to resist a little amount over this voltage.

Economic protection due to the Fact that it is very efficacy and also because operates only during non programmed events, clearing failures in a very quick way therefore it's current capacity is very low.

The invention claimed is:

1. A passive and autonomous protection circuit for a two wire system for protecting electric and electronics equipment from both positive and negative over-voltages occurring between both said wires, said protection circuit be connected between first and second said wires and between a power supply and said equipment, the protection circuit comprising:

an inductor (Lak) with first and second terminals so that the first terminal of said inductor is connected to said first wire, a power resistor (Rak) with first and second terminals so that the second terminal of said power resistor is connected to said second wire, first and second semiconductors (S1,S2), each semiconductor comprising an anode terminal, a cathode terminal and a gate terminal, the anode terminal of said first semiconductor (S1) and the cathode terminal of said second semiconductor (S2) being connected to the second terminal of said inductor (Lak), and the cathode terminal of said first semiconductor (S1) and the anode terminal of said second semiconductor (S2) being connected to the first terminal of said power resistor (Rak) so as to provide a circuit path for over-voltage induced currents of positive or negative polarity between said first and second wires, and a firing and over-voltage threshold sensing circuit for each said semiconductor (S1,S2).

2. The protection circuit as defined in claim 1, wherein each said firing and over-voltage threshold sensing circuit comprises:

a resistor (Rg) so that a first terminal of said resistor (Rg) is connected to the anode terminal of each said semiconductor, a gate block diode (Dg) with an anode and a cathode terminal so that the anode terminal of said diode (Dg) is connected to a second terminal of said resistor (Rg), a zener diode (Zg) with an anode and a cathode terminal so that the cathode terminal of said zener diode (Zg) is connected to the cathode terminal of said diode (Dg), and the anode terminal of said zener diode (Zg) is connected to the gate terminal of each said semiconductor (S1, S2), with a regulator voltage of said zener diode (Zg) and said resistor (Rg) defining a threshold of over-voltage, a gate protective zener diode (Zgk) with an anode and a cathode terminal so that the cathode terminal of said zener diode (Zgk) is connected to the anode terminal of said zener diode (Zg), and the anode terminal of said zener diode (Zgk) is connected to the cathode terminal of each said semiconductor (S1,S2).

3. The protection circuit as defined in claim 2, wherein said zener diode (Zg) is composed by one or several elements of different zener voltages.

4. The protection circuit as defined in claim 2, wherein said zener diodes (Zg) is constructed and arranged with the Rg resistance to control the gate current.

5. The protection circuit as defined in claim 2, wherein said gate protective zener diode (Zgk) is a zener diode or zener diode arrangement with a zener voltage less than a maximum voltage supported by the gate of said semiconductor.

6. The protection circuit as defined in claim 2, wherein said gate protective zener diode (Zgk) is a diode or a diode arrangement with direct voltage, less than a maximum voltage supported by the gate of said semiconductor.

7. The protection circuit as defined in claim 2, wherein said gate block diode (Dg) is a diode or a diode arrangement with a reverse voltage greater than a maximum voltage supported by said semiconductor.

8. The protection circuit as defined in claim 1, wherein said protection circuit is connected in parallel to other over-voltage protector as a varistor (Vak) and a capacitor bank (Cak).

9. The protection circuit as defined in claim 1, wherein each said semiconductor is a MOSFET, or any semiconductor with a property of being fired by gate or base current and turned off by an absence of gate or base current.

10. The protection circuit, as defined in claim 1, in combination with one or more said circuits in series to support certain voltages.

11. The protection circuit, as defined in claim 1, in combination with one or more said circuits in parallel to support certain currents.

12. The protection circuit, as defined in claim 1, in combination with a single phase voltage or current source network for unidirectional or bi-directional protection when the circuit is installed between a phase and a neutral conductor.

13. The protection circuit, as defined in claim 1, in combination with a single phase voltage or current source network for unidirectional or bi-directional protection when the circuit is installed between a phase and a ground conductor.

14. The protection circuit, as defined in claim 1, in combination with a three phase voltage or current source network for unidirectional or bi-directional protection when the circuit is installed between phase conductors.

15. The protection circuit, as defined in claim 1, in combination with a three phase voltage or current source network for unidirectional or bi-directional protection when the circuit is installed between a phase conductor and a neutral conductor.

16. The protection circuit, as defined in claim 1, in combination with a three phase voltage or current source network for unidirectional or bi-directional protection when the circuit is installed between a phase conductor and a ground conductor.

17. The protection circuit, as defined in claim 1, in combination with a continuous or unidirectional voltage source network for unidirectional or bi-directional protection.

18. A passive and autonomous protection circuit for a two wire system for protecting electric and electronics equipment from both positive and negative over-voltages occurring between both said wires, said protection circuit be connected between first and second said wires and between a power supply and said equipment, the protection circuit comprising:
   an inductor
   a resistor
   first and second control structures, each control structure being associated with the inductor and the resistor to provide a circuit path for over-voltage induced currents of positive or negative polarity between said first and second wires, and
   a firing and over-voltage threshold sensing circuit for each said control structure.

19. The protection circuit as defined in claim 18, wherein the inductor (Lak) has first and second terminals so that the first terminal of said inductor is connected to said first wire, each control structure being a semiconductor having an anode terminal, a cathode terminal and a gate, an anode terminal of said first semiconductor and a cathode terminal of said second semiconductor being connected to the second terminal of said inductor (Lak).

20. The protection circuit as defined in claim 19, wherein the resistor is a power resistor (Rak) with first and second terminals so that the second terminal of said power resistor is connected to said second wire, the cathode terminal of said first semiconductor and the anode terminal of said second semiconductor being connected to the first terminal of said power resistor (Rak).

21. The protection circuit, as defined in claim 18, wherein each said control structure is at least one of a thyristor, a GTO, a TRIAC or any semiconductor with the property of being fired by gate current and turned off by circuit natural conditions.

22. The protection circuit as defined in claim 18, wherein each said control structure is at least one of a bipolar transistor, a MOSFET, a IGBT or a structure with the property of being fired by gate or base current and turned off by absence of gate or base current.

23. The protection circuit as defined in claim 18, wherein each said control structure is at least one of a gate, a base or a grid controlled discharge device.

* * * * *